US012705230B2

(12) United States Patent
Webman et al.

(10) Patent No.: US 12,705,230 B2
(45) Date of Patent: Aug. 11, 2026

(54) MECHANISMS FOR EFFICIENT CLEANING OF UNNEEDED ROW-VERSIONS OF A DATABASE

(71) Applicant: Regatta Data Ltd., Bet Hanania (IL)

(72) Inventors: Erez Webman, Petach Tikva (IL); Irit Yadin-Lempel, Caesarea (IL); Eran Borovik, Zikhron Ya'akov (IL); Hilla Atzmon, Haifa (IL)

(73) Assignee: Regatta Data Ltd., Bet Hanania (IL)

( * ) Notice: Subject to any disclaimer, the term of this patent is extended or adjusted under 35 U.S.C. 154(b) by 0 days.

(21) Appl. No.: 18/641,856

(22) Filed: Apr. 22, 2024

(65) Prior Publication Data

US 2024/0370418 A1 Nov. 7, 2024

Related U.S. Application Data

(60) Provisional application No. 63/499,566, filed on May 2, 2023.

(51) Int. Cl.
*G06F 16/27* (2019.01)
*G06F 16/215* (2019.01)
*G06F 16/23* (2019.01)

(52) U.S. Cl.
CPC ........ *G06F 16/2379* (2019.01); *G06F 16/215* (2019.01); *G06F 16/27* (2019.01)

(58) Field of Classification Search
None
See application file for complete search history.

(56) References Cited

U.S. PATENT DOCUMENTS 7,395,382 B1 * 7/2008 Moir ........................ G06F 9/466 711/147
9,659,038 B2 5/2017 Saito et al.
(Continued)

FOREIGN PATENT DOCUMENTS

CN 114968976 A 8/2022
EP 2595068 5/2013
(Continued)

OTHER PUBLICATIONS

Ling Zhang; Everything is a Transaction: Unifying Logical Concurrency Control and Physical Data Structure Maintenance in Database Management Systems; 2021; pp. 1-9.*
(Continued)

*Primary Examiner* — Jermaine A Mincey
(74) *Attorney, Agent, or Firm* — M&B IP Analysts, LLC

(57) ABSTRACT

A method for cleaning unneeded row-versions in a distributed database system including a plurality of nodes are provided. The method comprising: receiving, by a node of the plurality of nodes, a stream of at least Point-in-Time (PiT) creation events and PiT removal events; receiving a list of committed transaction identifiers (IDs) of committed transactions executed by the distributed database system; inspecting row-versions in the distributed database system to identify unneeded row-versions that can be safely removed, wherein the inspection is performed in part using the stream of PiT creation events and PiT removal events, and the list of committed transaction IDs; and removing the unneeded row-versions identified by the inspection.

27 Claims, 9 Drawing Sheets

(56) References Cited

U.S. PATENT DOCUMENTS

| | | | | |
|---|---|---|---|---|
| 10,630,840 | B1* | 4/2020 | Karp | H04M 3/5235 |
| 11,593,316 | B2 | 2/2023 | Haldar et al. | |
| 11,843,663 | B1 | 12/2023 | Depoutovitch et al. | |
| 12,056,130 | B1 | 8/2024 | Ayala et al. | |
| 12,321,847 | B2 | 6/2025 | Kauffmann et al. | |
| 2007/0271242 | A1 | 11/2007 | Lindblad | |
| 2012/0311273 | A1* | 12/2012 | Marathe | G06F 9/467 711/E12.001 |
| 2013/0085988 | A1* | 4/2013 | Hiraguchi | G06F 16/27 707/703 |
| 2016/0092496 | A1 | 3/2016 | Dietterich et al. | |
| 2016/0306709 | A1 | 10/2016 | Shaull | |
| 2017/0139890 | A1 | 5/2017 | Bendig et al. | |
| 2017/0357577 | A1 | 12/2017 | Lee et al. | |
| 2018/0113781 | A1* | 4/2018 | Kim | G06F 9/451 |
| 2018/0144014 | A1 | 5/2018 | Mittal et al. | |
| 2018/0349418 | A1 | 12/2018 | Lee et al. | |
| 2021/0034598 | A1 | 2/2021 | Arye et al. | |
| 2022/0164366 | A1 | 5/2022 | Kuppahally et al. | |
| 2022/0245133 | A1 | 8/2022 | Li | |
| 2022/0300483 | A1* | 9/2022 | Singh | G06F 16/2474 |
| 2023/0334031 | A1 | 10/2023 | Acker et al. | |
| 2023/0385742 | A1 | 11/2023 | Dybas et al. | |
| 2024/0370418 | A1 | 11/2024 | Webman et al. | |
| 2025/0028694 | A1 | 1/2025 | Yadin-Lempel et al. | |
| 2025/0156400 | A1 | 5/2025 | Al-Shihabi et al. | |

FOREIGN PATENT DOCUMENTS

| | | | | |
|---|---|---|---|---|
| EP | 2738697 | A1* | 6/2014 | G06F 17/3015 |
| EP | 3401806 | A1 | 11/2018 | |
| WO | 2019226387 | A1 | 11/2019 | |

OTHER PUBLICATIONS

International Search Report for PCT/IB2024/050987, dated Jul. 11, 2024. Searching Authority, Israel Patent Office, Jerusalem, Israel.

Moh, Chuang-Hue; Liskov, Barbara. TimeLine: A High Performance Archive for a Distributed Object Store. In: NSDI. 2004. p. 351-364. Mar. 29, 2004 (Mar. 29, 2004) the whole doc.

Written Opinion of the Searching Authority for PCT/IB2024/050987, dated Jul. 11, 2024. Searching Authority, Israel Patent Office, Jerusalem, Israel.

Yong I Yoon, Song C Moon, Reliable transaction processing for real-time distributed database systems, Microprocessing and Microprogramming, vol. 34, Issues 1-5, 1992, pp. 63-66, ISSN 0165-6074, Feb. 28, 1992 (Feb. 28, 1992) the whole doc.

International Search Report for PCT/IB2024/056903, dated Nov. 10, 2024. Searching Authority, Israel Patent Office, Jerusalem, Israel.

Written Opinion of the Searching Authority for PCT/IB2024/056903, dated Nov. 10, 2024. Searching Authority, Israel Patent Office, Jerusalem, Israel.

ADO.net, Snapshot Isolation in SQL Server, Sep. 15, 2021, pp. 1-5 (Year: 2021).

Barber, Ronald, et al., "WiSer: A Highly Available HTAP DBMS for IoT Applications", BigData 2019, Los Angeles, CA, Dec. 9-12, 2019, pp. 268-277.

Moh, Chuang-Hue, "Snapshots in a Distributed Persistent Object Storage System", Massachusetts Institute of Technology, Boston, MA, Master of Science in Electrical Engineering and Computer Science Dissertation, May 2003, 62 pages.

Scriba, Dr. Albrecht, "Chapter 9: Point In Time Copies (Snapshots)", Storage Management in Data Centers, Springer-Verlag, Berlin, Germany, © 2009, pp. 233-317.

Sybooks online, Snapshot isolation, 2012 (Year: 2012).

Sybooks online., Enabling snapshot isolation, 2012 (Year: 2012).

Wu, Lengdong, et al., "Survey of Large-Scale Data Management Systems for Big Data Systems", Journal of Computer Science and Technology, vol. 30, Issue 1, SpringerNature Link, Jan. 2015, pp. 163-183.

* cited by examiner

MECHANISMS FOR EFFICIENT CLEANING OF UNNEEDED ROW-VERSIONS OF A DATABASE

CROSS-REFERENCE TO RELATED APPLICATIONS

This application claims the benefit of U.S. Provisional Application No. 63/499,566 filed on May 2, 2023, the contents of which are hereby incorporated by reference.

TECHNICAL FIELD

The present disclosure generally relates to databases, and specifically, techniques for implementation for efficient cleaning of unneeded row-versions of databases.

BACKGROUND

In databases, concurrency control (CC) protocols ensure that correct results for concurrent operations are generated as quickly as possible. Typically, a concurrency control protocol provides rules and methods typically applied by the database mechanisms to maintain the consistency of transactions operating concurrently and, thus, the consistency and correctness of the whole database. Introducing concurrency control into a database would apply operation constraints which typically result in some performance reduction. Operation consistency and correctness should be achieved with as good as possible efficiency without reducing the database's performance. However, a concurrency control protocol can require significant additional complexity and overhead in a concurrent algorithm compared to the simple sequential execution of the transaction.

Databases are designed with Atomicity, Consistency, Isolation, and Durability (ACID) requirements. In some databases, the ACID requirements are relaxed, where multiple transactions can be executed concurrently and independently of each other, such that transaction access overlaps. That may result in various inconsistencies or anomalies. A database can be designed to provide ACID guarantees that eliminate or minimize the exposure of such anomalies. In general, there are varying degrees of ACID guarantees, and many databases provide a non-perfect degree of ACID guarantees, where the exact guarantees vary among the different database products.

Typically, such guarantees are defined by the isolation level of their transaction execution. An isolation level expresses how transactions are "isolated" from each other, especially related to their data-cell read and write activities. That is, isolation of transactions means how the anomalies can be mitigated or completely avoided. The strongest transaction isolation level is serializable. In this isolation level, the database provides mechanisms guaranteeing the isolation for the concurrent execution of transactions, while maximizing the concurrency of the execution transactions as much as possible.

A relaxed approach for isolation-level guarantees, as performed by some traditional relational databases is based on creating a "frozen" point-in-time image (hereafter PiT Image, or simply a PiT or PiTs) for a transaction. The PiT provides the state and the content of the committed data and allows to read data cell based on the values of a PiT.

Various techniques for creating, maintaining, and removing PiTs are discussed in the related art. However, these techniques are mostly limited to creating, maintaining, and removing PiTs in a non-distributed database. A distributed database includes multiple nodes (typically, a node is a computer) where the nodes may be situated in the same physical location or in multiple locations.

Creating, maintaining, and removing PiTs in a distributed database provides a number of challenges not efficiently addressed by currently available PiT solutions. For example, creating a PiT in a distributed environment requires that the point-in-time of the frozen "transaction" be consistent across all the nodes of the database. Further, current solutions are not scalable enough, not fast enough, and slow down other activities in a non-linearly scalable fashion, thereby such a solution does not allow a very high-rate PiT creation, especially in clusters with a large number of nodes.

In the context of databases and data management, "row-versioning" typically refers to a mechanism that maintains a historical version of each row in a table to manage concurrency and to provide the ability to restore or read previous versions. Row versioning is a database management technique used to maintain different versions of the same row at the same time. For example, if a row is modified after a Point-in-Time (PiT) is created, the database needs to maintain both the original and modified versions of the row. Similarly, if a row is updated during a transaction, some databases keep the updated version as an uncommitted row version until the transaction commits alongside the original row version.

In order to create PiTs, specific data structures such as row-versions need to be generated. However, some of these data structures may become not required on certain occasions, for example, once a transaction is committed, or when certain PiTs are removed, and so on. The removal of such not-required data structures is essential for the efficient operation of the database. Removing these structures is not as simple because such structures may be needed by a possibly different set of multiple PiTs. Thus, determining when each such structure is no longer required is not a simple task. There are various techniques available to clean up unneeded row versions of a database, but most of them are resource-intensive and time-consuming, which can limit performance. For example, a technique, such as a PostgreSQL's Vacuum cleaning requires crawling the database rows. This technique is costly both in terms of performance and resource usage.

It would therefore be advantageous to provide efficient solutions for efficiently removing unneeded data structures in distributed databases.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include receiving, by one a node of the plurality of nodes, a stream of at least Point-in-Time (PiT) creation events and PiT removal events. Method may also include receiving a list of committed transaction identifiers (IDs) of committed transactions executed by the distributed database system. Method may furthermore include inspecting row-versions in the distributed database system to identify unneeded row-versions that can be safely removed, where the inspection is performed in part using the stream of PiT creation events and PiT removal events, and the list of committed transaction IDs. Method may in addition include removing the unneeded row-versions identified by the inspection. Other embodiments of this aspect include corresponding computer systems, apparatus, and computer programs recorded on one or more computer storage devices, each configured to perform the actions of the methods.

In one general aspect, non-transitory computer-readable medium may include one or more processors configured to: receive, by one a node of the plurality of nodes, a stream of at least Point-in-Time (PiT) creation events and PiT removal events; receive a list of committed transaction identifiers (IDs) of committed transactions executed by the distributed database system; inspect row-versions in the distributed database system to identify unneeded row-versions that can be safely removed, where the inspection is performed in part using the stream of PiT creation events and PiT removal events, and the list of committed transaction IDs; and remove the unneeded row-versions identified by the inspection.

In one general aspect, a system may include cleaning unneeded row-versions in a distributed database system including a plurality of nodes. The system may include one or more processors configured to: receive, by one a node of the plurality of nodes, a stream of at least Point-in-Time (PiT) creation events and PiT removal events; receive a list of committed transaction identifiers (IDs) of committed transactions executed by the distributed database system; inspect row-versions in the distributed database system to identify unneeded row-versions that can be safely removed, wherein the inspection is performed in part using the stream of PiT creation events and PiT removal events, and the list of committed transaction IDs; and remove the unneeded row-versions identified by the inspection.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
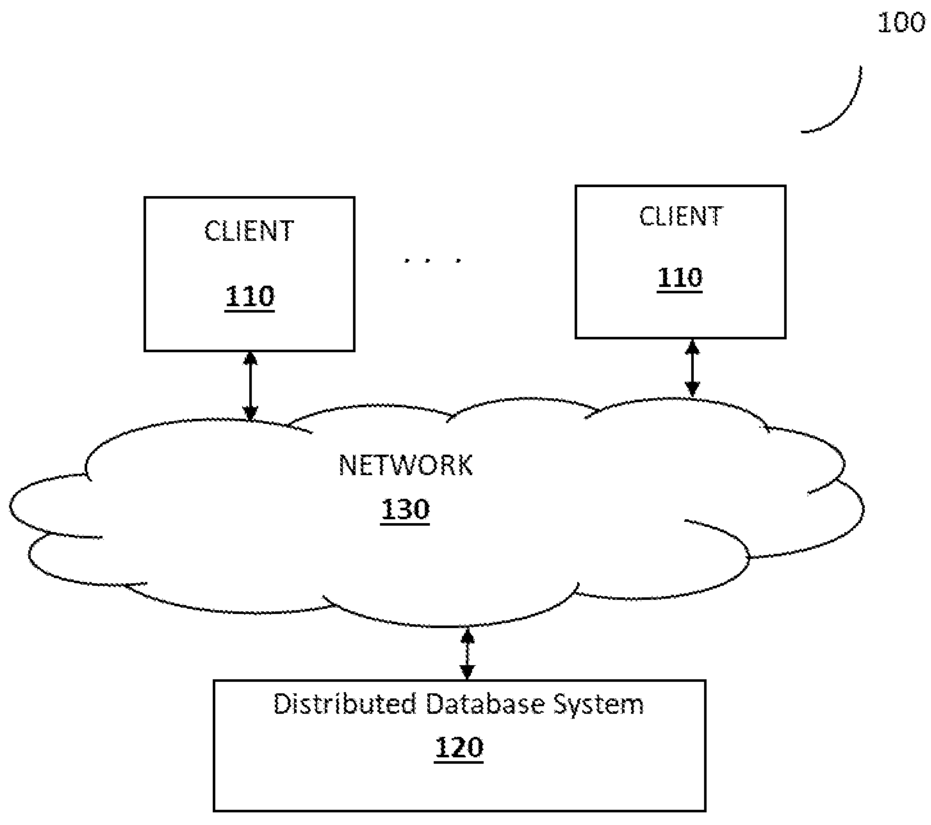
FIG. 1 is a network diagram of a distributed computing environment utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, numerals refer to like parts through several views.

Some example embodiments provide a system and method for efficiently and timely cleaning unneeded row versions in a distributed database. In some embodiments, the cleaning of unneeded row versions is compatible with cleaning techniques discussed in the related art. As a non-limiting example, the cleaning techniques disclosed herein clean some of the unneeded row versions, whereas a known cleaning technique could then subsequently clean the remaining uncleaned, unneeded row versions.

Generally, the cleaning of unneeded row versions is often managed by each of the nodes in a distributed database that has stored unneeded row versions thereon. In order to identify unneeded row versions correctly, known cleaning techniques often need to know which PiTs exist. In this regard, it has been identified that helping "known cleaning techniques" obtain necessary information in a distributed database can be improved by providing efficient and scalable ways to propagate the information to the various nodes.

The existence of unneeded row-versions often does not hurt the correctness of a database system, unneeded row-versions consume resources and can degrade the performance of the database. In this regard, it has been identified that removing unneeded row-versions can be improved by providing a more efficient cleaning technique. In particular, the processing power, I/O operations to the disk, and memory used to clean unneeded row versions may be reduced and quickened, resulting in a more efficient, cheap, and fast cleaning technique.

It should be noted that the embodiments described herein are not limited to database systems but are also applicable to distributed data management systems, such as an object storage system, a key-value storage system, a file system, and the like.

FIG. 1 shows an example network diagram 100 of a distributed computing environment utilized to describe the various disclosed embodiments. In the example network diagram 100, a plurality of clients 110 and a distributed database system (or simply database) 120 are connected to a network 130. The network 130 may be but is not limited to, wireless, cellular, or wired network, a local area network (LAN), a wide area network (WAN), a metro area network (MAN), the Internet, the Worldwide web (WWW), similar networks, and any combination thereof.

Each client 110 is configured to access the database 120 through the execution of transactions. A client 110 may include any computing device executing applications, services, processes, and so on. A client 110 can run a virtual instance (e.g., a virtual machine, a software container, and the like).

In some configurations, clients 110 may be software entities that interact with the database 120. Clients 110 are typically located in compute nodes that are separate from the database 120 and communicate with the database 120 via an interconnect or over a network. In some configurations, an instance of a client 110 can reside in a node that is part of the database 120.

The database 120 may be designed according to a shared-nothing or a shared-everything architecture. In one example embodiment, transactions to the database 120 are processed without locks placed on data entries in the database 120. This allows for fast processing retrieval and modifications of data sets.

A transaction is issued by a client 110, processed by the database 120, and the results are returned to the client 110. A transaction typically includes the execution of various data-related operations over the database system 120. These operations are often originated by clients 110. The execution of such operations may be short or lengthier. In many cases, operations may be independent and unaware of each other's progress.

A transaction can be viewed as an algorithmic program logic that potentially involves reading and writing various data-cells. A transaction, for example, may read some data-cells through one data operation, and then, based on the values read, can decide to modify other data-cells. That is, a transaction is not just an "I/O operation" but is more of a "true" computer program. A data-cell is one cell of data. Data cells may be organized and stored in various formats and ways. Data cells, defined below, may be contained in files or other containers and can represent different types of data (integer, string, and so on).

In one embodiment, an execution of a transaction may be shared between a client and the database 120. For instance, in an SQL-based relational database, client 110 interacts with the database using SQL statements. Client 110 can begin a transaction by submitting an SQL statement. That SQL statement is executed by database 120. Depending on the exact SQL statement, database 120 performs various read and/or write operations as well as invokes algorithmic program logic typically to determine which (and whether) data-cells are read and/or written. Once that SQL statement is completed, the transaction is generally still in progress.

The client 110 is configured to receive the response for that SQL statement and potentially executes some algorithmic program logic (inside the client node) that may be based on the results of the previous SQL commands, and as a result of that additional program logic, may submit an additional SQL statement and so forth. At a certain point, and once the client 110 receives an SQL statement response, the client 110 can instruct the database 120 to commit the transaction.

It should be noted that the client 110 can submit a transaction as a whole to the database 120, and/or submit multiple statements for the same transaction together, and/or submit a statement to the database 120 with an indication for the database to commit after the database 120 completes the execution of that statement.

It should be further noted that transactions may be abortable by the database 120 and/or a client 110. Often, aborting a transaction clears any of the transaction's activities.

For the sake of simplicity and ease of description, a reference is made to a transaction initiated and committed by a client, and statements of the transaction are performed by the database 120. A transaction may include one or more statements. A statement may include, for example, an SQL statement. One of the statements may include a request to commit the transaction. In order to execute such a statement, the database may break the statement execution into one or more tasks, where each such task is running on a node. In this particular embodiment, a task does not execute on more than a single node, but multiple tasks of the same statement can execute on the same node if needed. A task is an algorithmic process that may require the execution of read operation(s) and/or write operations(s) on data cells.

In an embodiment, the database 120 is a distributed database and may be realized as a relational database system (RDBMS) or a non-relational database. As will be demonstrated in FIG. 2 below, a distributed database is a configuration of multiple nodes that may be situated in the same physical location, or in multiple locations. Such locations are typically not geographically distributed. In some embodiments, the distribution arrangement of database 120 requires the execution of transactions and their operations on different nodes independent of each other. Typically, a node is a computer, however, it can also be a virtual server, a user-mode process, a combination thereof, and the like.

Figure 2:
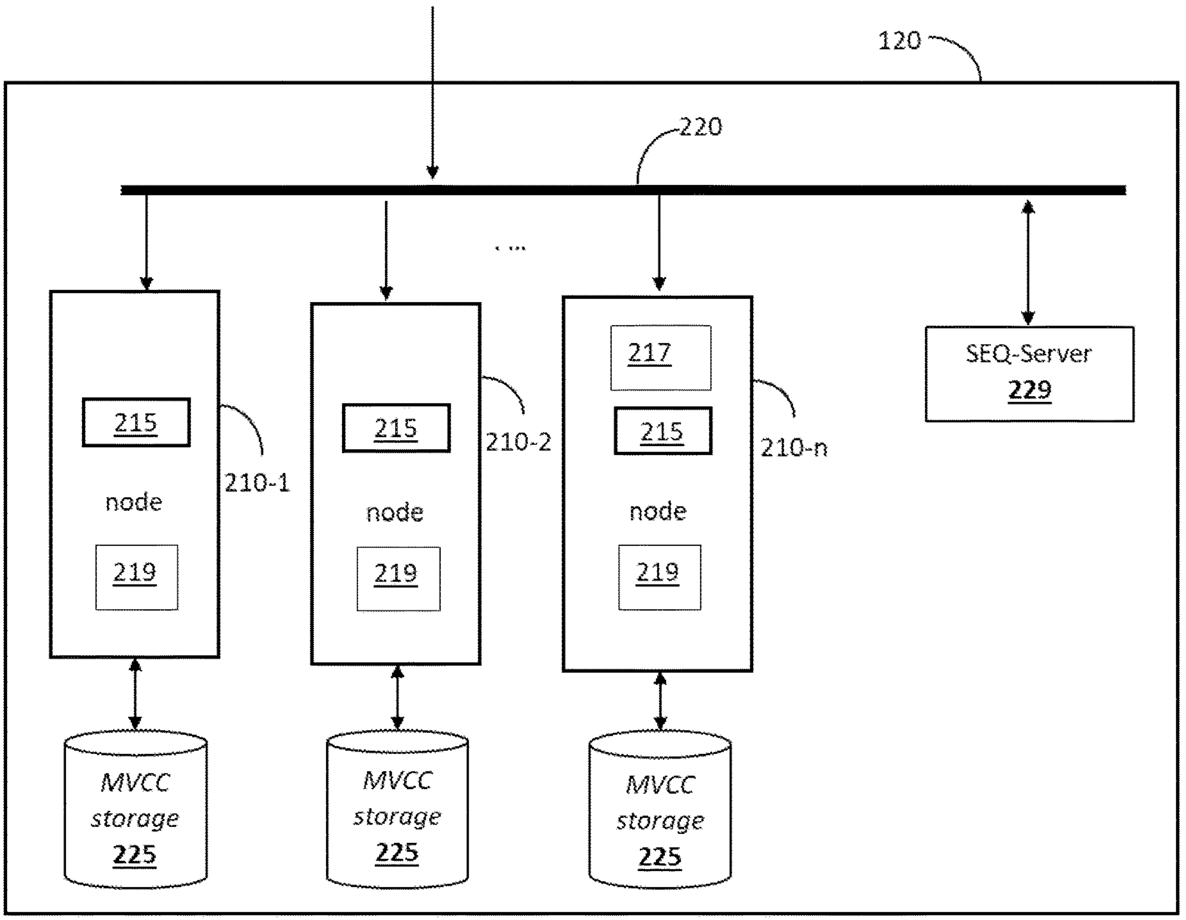
FIG. 2 is a block diagram of a distributed database system arranged according to an embodiment.

FIG. 2 shows an example diagram of database 120 arranged according to an embodiment. The database 120 includes a plurality of nodes 210-1 through 210-*n*, which are distributed. Each node 210 may be realized as a physical device or a virtual instance executed on a physical device. A virtual device may include a virtual machine, a software container, a service, and the like. The physical device, an example of which is disclosed below, includes at least a processing circuitry and a memory. A physical device may also include a storage, a shared storage accessed by other nodes 210, or a combination thereof. The storage stores the data maintained by the database 120. The nodes 210 may be deployed in one or more data centers, cloud computing platforms, and the like. The communication and synchronization among the nodes 210 is performed through an interconnect network 220.

In one embodiment, the nodes 210, and hence the database 120 are designed with a shared-nothing architecture. In such an architecture, nodes 210 are independent and self-sufficient as they have their own disk space and memory. As such, in the database 120, the data is split into smaller sets distributed across the nodes 210. In another embodiment, the nodes 210, and hence the database 120 are designed with a shared-everything architecture where the storage is shared among all nodes 210.

The data managed by the database can be viewed as a set of data-cells. Typically, data-cells would be considered as items, such as what relational databases refer to as "column cells," those data-cells can actually be any type of data, a data object, a file, and the like.

Databases often organize a higher level of a data-cell referred to as a data-row (or simply row). A data-row may include a collection of specific data-cells. For example, in relational databases, a set of rows form a database table. The data-cells contained by a specific row are often related to one "entity" that the row describes. In relational databases, the concept of a data-row is inherent to the data-model (i.e., one of the foundations of the relational data-model is processing "data tuples" that are effectively data-rows). Often, data-cells can be added or removed only as part of their data-row. In other words, a data-row can be added (or removed), thus adding more (or removing existing) data-cells to the database.

Typically, all the data-cells of a specific row reside in close proximity (e.g., consecutively) on the storage device (as well as in RAM), as this can ensure that multiple cells of the same row (or all the cells of the row) can be read from the disk more cheaply (e.g., with a single small disk I/O) than if those cells would each be stored elsewhere on the disk (e.g., with n disk I/Os to n different disk locations in order to retrieve n cells of the same row). Further, the metadata for managing the data-cell information may also be organized in a rougher resolution as it may result in meaningfully lesser and smaller overall metadata.

In some embodiments, a specific data-row can be viewed as if it exists and just contains a single specific data-cell. In one embodiment, and without limiting the scope of the disclosed embodiments, a single cell, and a single row may reside in a specific storage device of a node 210. However, it should be noted that a row can be divided across multiple nodes 210. It should be further noted that the disclosed embodiments can be adapted to operate in databases where data cells are stored and arranged in different structures. In some embodiments, where a row is divided across multiple nodes, the "sub row" that is stored under a single node and/or storage device could be treated as a data-row.

In another embodiment, and without limiting the scope of the disclosed embodiments, the database may also store various pieces of data, in addition to the data-cells and data-rows, including, but not limited to, any and all metadata, various data structures, configuration information, a combination thereof, and the like (hereinafter "metadata").

In some embodiments, an operation of a task may access a single data-cell in a single node 210. Furthermore, multiple operations (of the same or different transactions) may access the same data cells simultaneously or substantially at the same time. In these embodiments, there is no synchronization when such operations, tasks, or statements of a transaction or transactions are performed. In a typical computing environment, hundreds of concurrent transactions can access the database 120. As such, maintaining and controlling the consistency of transactions and their operations is a critical issue to resolve in databases.

In an embodiment, each node 210 includes an agent (or a transaction agent) 215 configured to manage access to data stored on the respective node. The agent 215 may be realized in hardware, software, firmware, or a combination thereof. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The agent 215 is configured to manage the contents of data cells and operations within a node. For example, when a write operation requires access to data-cell(s), the agent 215 may be configured to point to the requested cell(s). In an embodiment, each transaction is managed by a transaction manager 217. A transaction manager 217 is an instance executed over one of the nodes 210 and configured to orchestrate the execution of a transaction across one or more nodes 210. The transaction manager 217 may be instantiated on any node 210.

In the example shown in FIG. 2, the transaction manager 217 is configured to be executed on the node 210-*n*. The transaction manager 217 can be realized as a software object, a script, and the like executed over the hardware of a respective node 210. It should be noted that multiple transaction managers may be executed on one node or multiple nodes, where each transaction manager 217 can handle a single transaction.

A sequence server (SEQ-server) 229 can be viewed as a software module. According to an embodiment, the database 120 contains a single SEQ-server 229, running on one of the nodes 210. In some embodiments, the SEQ-server 229 is configured to dynamically move to another node 210 for various practical needs, such as, but not limited to, the need to provide high-availability and fault-tolerance, the need to balance the overall load of the cluster, the need to remove the node that the SEQ-server 229 is currently on, a combination thereof, and the like. In one embodiment, the SEQ-server 229 is statically located. In another embodiment, the SEQ-server 229 is configured to be moved.

According to one configuration, the SEQ-server 229 is configured to run on a dedicated node 210, in one of the nodes 210, outside of a node 210.

According to the disclosed embodiments, the SEQ-server 229 is configured to execute processes for the creation of point-in-time images (hereinafter "PiT" or "PiTs"). The SEQ server is also responsible for allocating commitment timestamps (CMTSs). A PiT is the current state (or contents) of the data maintained by the database system 120 of the committed data for a given timestamp. A PiT is typically created at the beginning of the transaction (or during the execution of a transaction) upon request initiated by a transaction manager. As discussed in detail below, the disclosed embodiments allow the creation of PiTs with minimal communication between transaction managers and the SEQ-Server 229 and without any need to synchronize the creation of PiTs among other nodes 210.

In an embodiment, the SEQ-server 229 is configured to include or implement a logical timestamp counter (LTC). The LTC is incremented (or increased) upon creation of a PiT. It should be noted that the LTC can be realized as an integer counter, a timer, a register, and the like, or any monotonically increasing counter. Further, the LTC can be incremented by one or increased by any arbitrary number. The LTC's value is treated as a PiT creation timestamp. It should be emphasized that there is a single LTC in the SEQ-server 229 that provides the timestamp for PiT or CMTS.

According to the various disclosed embodiments, a sequencer agent (SEQ-agent) 219 is a software entity. In some embodiments, SEQ-agents 219 are located in various database nodes 210. The SEQ-agent 219 is configured to communicate with the SEQ-server 229 and provide various services to a respective node. In one configuration, the SEQ-agents 219 are located inside of each node. In another configuration, the SEQ-agents 219 may be separate from the node and be located in different areas such as, but not limited to, a different node 210 than the node using the services of the SEQ-agent 219. In some embodiments, the SEQ-agent 219 is configured to provide services to multiple nodes.

The Multi-Version Concurrency-Control (MVCC) storage 225 is a persistent storage or memory configured to store data. Further, in some embodiments, the MVCC can be realized as a data-layout on a physical or virtual disk. According to an embodiment, node 210 is responsible for specific data-cells and data-rows. Each node has access to MVCC storage 225 that allows read and write operations based on the MVCC data-layout configured with the MVCC storage 225. It should be noted that, in some embodiments, the database 120 may contain stateless compute nodes whose main functionality is to participate in various computations the database performs. Such nodes may not necessarily contain the MVCC data layout.

In some embodiments, the structure of the Multi-Version Concurrency-Control (MVCC) data-layout is a persistent data-layout that allows multi-version data-cells in the MVCC storage 225, regardless of whether the CC-protocol in use directly exploits multi-version data-cells or not. Typically, databases need the ability to store multiple data-cell versions for various reasons, including for PiT maintenance and for storing uncommitted data-cell versions as well as temporarily storing both uncommitted versions, committed versions, uncommitted versions that just recently became committed versions, committed versions that just recently became not-up-to-date versions (and may soon be removed), and so on.

In such cases, there is a need for persistent (and sometimes also non-persistent) data-layouts that allow the maintenance of multiple versions. Such data-layouts allow various "write" operations, such as, for example, the insertion of new data-cells, the insertion of new data-cell versions, the modification of existing data-cell versions, the removal of data-cell versions or of the entire data-cell, etc. Further, databases typically store all the data-cells of a data-row together rather than storing each data-cell separately. Therefore, MVCC data-layouts often store data-rows and data-row-versions rather than data-cell and data-cell versions. If a specific data-cell has a new version, such MVCC data-layouts store a new version of the entire row.

In databases, "row-versioning" typically refers to a mechanism that maintains a historical version of each row in a table to manage concurrency and to provide the ability to restore or read previous versions. Row versioning is a database management technique used to maintain different versions of the same row at the same time. For example, if a row is modified after a PiT is created, the database needs to maintain both the original and modified versions of the row. Similarly, if a row is updated during a transaction, some databases keep the updated version as an uncommitted row version until the transaction commits alongside the original row-version.

In an embodiment discussed herein, the MVCC data-layout uses a row granularity, where versioning is managed using row-versions and where a data-row can be added or removed. It should be noted that MVCC data-layouts that use different (finer or rougher) granularities, such as data-cell granularity can be used as well. Further, embodiments where the data-cells can be added and/or removed are supported as well.

The MVCC data-layout also provides a means for searching and reading specific row-versions (or any subset of their data-cells). For example, searching and reading a specific row can be done by using any specific row identification technique the database is internally using. The second aspect is the need to reach the desired version of the row, where it is not always known ahead of time which version that would be. In many cases, this task is achieved by performing searches that refer to the timestamps of the existing versions of the row, and/or by traveling between versions of the same row by their timestamp (possibly in either direction).

It should be noted that the timestamp information can be considered part of the metadata used for the realization of the MVCC data-layout. In some embodiments, the MVCC data-layout utilizes the commitment timestamp (CMTS) as the timestamp used by the various read operations, and that MVCC data-layout is used also for storing uncommitted row-versions. In such embodiments, when a new row-version (e.g., for an existing row) is first created and is still in an uncommitted state, the CMTS is generally not yet known. This problem can be solved in a variety of approaches. It should be emphasized that the disclosed embodiments can be adapted to support any type of storage with any type of layout.

Figure 3:
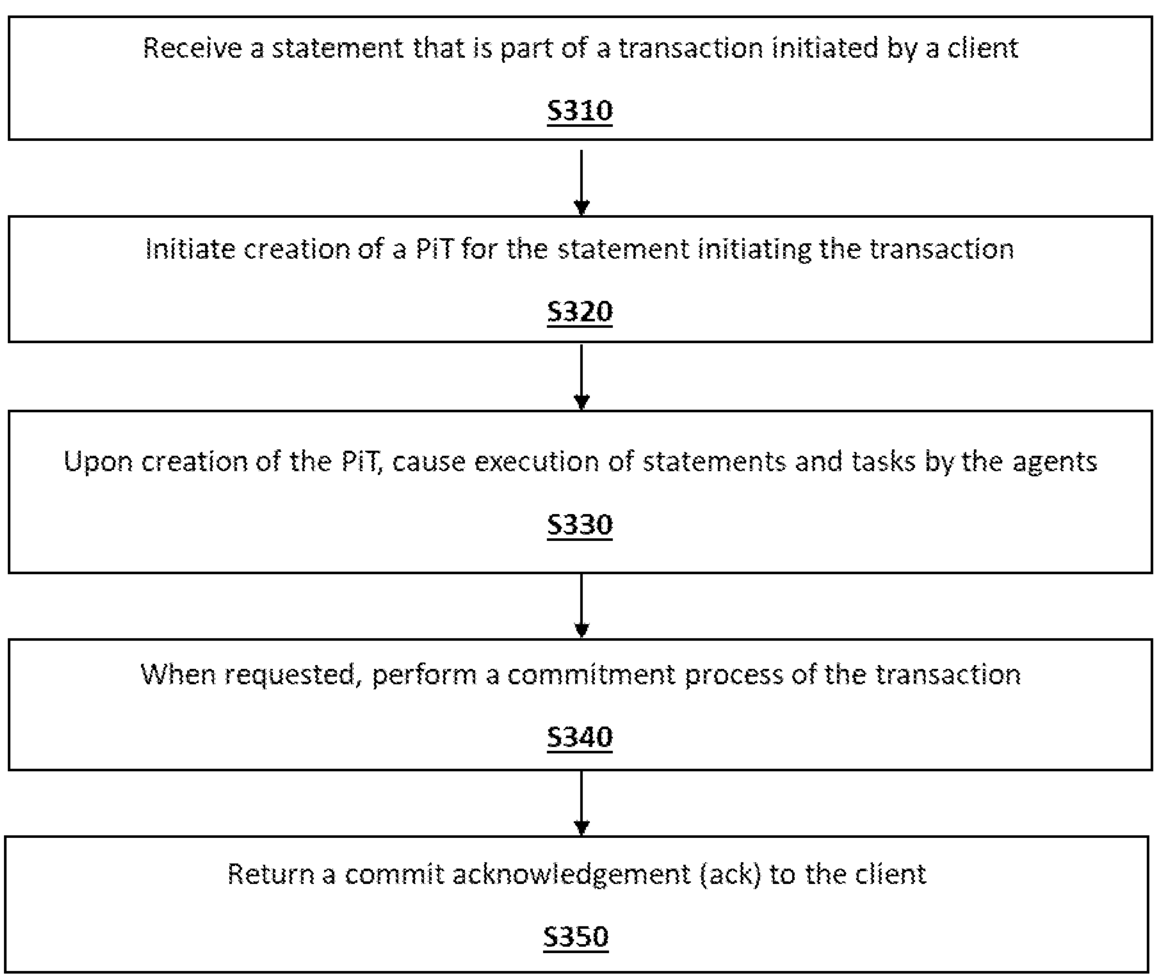
FIG. 3 is a flowchart of a method of operation of a transaction manager, according to an embodiment.

FIG. 3 shows an example flowchart 300 of a method for executing a transaction directed to the transaction database 120 according to an embodiment. The method can be performed by a transaction manager instantiated on one of the nodes, such nodes as 210, FIG. 2. It should be noted that FIG. 3 is an example that discusses the creation of a point-in-time image (PiT) at the beginning of the transaction. However, such creation of a PiT could occur at any and all stages of a transaction. Alternatively or collectively, a PiT may be created per statement received from a client to be executed over the database 120 or upon reception of a number of statements. It should be noted that the decision when to request and/or create a PiT may be based on the execution requirements of the transaction, required isolation-mode, and the like.

At S310, at least one statement that is part of a transaction initiated by a client is received. As mentioned above, a transaction may include a collection of statements, each of which may include a collection of tasks. A task may require the execution of read operation(s), write operation(s), or both. A statement may include a commit statement thereby committing the transaction.

It should be noted that the transaction manager resides or operates at node 210-1 to which a client sends statements of a transaction (TR1). Alternatively, the transaction manager for a transaction (TR1) may be set to run on another node 210-*n*. In such configuration, the node 210-1 may propagate the statements to the node 210-*n*. In this example embodiment, the transaction manager can manage a specific transaction (e.g., TR1). Other transaction managers manage other concurrently executed transactions. Typically, but not limited to, such transaction managers are spread across the cluster of nodes 210.

At S320, the creation of a point-in-time image (PiT) is initiated. In an embodiment, S320 occurs by the transaction manager when a PiT-based transaction begins. A PiT-based transaction may be utilized for repeatable-read isolation mode protocols, read-committed protocols, protocols that provide stronger isolation guarantees, specific moments during the transaction execution, a combination thereof, and the like. In an embodiment, an initiation of a PiT may be triggered when an execution of a task begins.

In an embodiment, to create the PIT, a PiT creation request is sent to the SEQ-agent. The SEQ-agent is configured to send such messages to the SEQ-server for the creation of the PiT. The SEQ-server is configured to increment the LTC where its value is returned as PiT creation timestamps by the SEQ-server to the SEQ-agent, and then from the SEQ-agent to the transaction manager.

In some instances, the SEQ-server is configured to asynchronously stream information about PiTs to all the nodes, for example, in order to remove unneeded row-versions. In some instances, it is desired to reduce the number of PiTs taken. Therefore, according to the disclosed embodiments, a single PiT (hereinafter a "Unified PiT") is created to be utilized by multiple different transactions.

It should be noted that causing the creation of a PiT at the beginning of a transaction or a statement is merely one example. A PiT can be created at any stage of the execution of the transaction or a statement. Once a PiT is created, an indication that the created PiT is ready is returned by the SEQ-agent 219. The PiT timestamp is also returned.

At S330, upon the reception of an indication that the PiT is ready, execution of statements and/or tasks by the respective transaction agents is initiated. To this end, the timestamp of the PiT is provided to the agents. It should be noted that, in this embodiment, PiT is created in response to a statement initiating the transaction. The PiT, in this embodiment, is not created for each received statement.

According to some embodiments, during S330, execution of read and/or write operations may be performed. In an embodiment, the statements may include but are not limited to, reading a data-cell or data-row (such as, PiT read and current read, etc.), writing to a data-cell or a data-row, modifying a row, and the like. In an embodiment, the execution of a transaction's statements is performed by a transaction manager. The executions of read and write operations are discussed in detail below.

In this embodiment, it should be noted that S330 is performed as long as the received statements require execution of a read operation, a write operation, or any operation that is not a commit. Upon receiving a commit statement, execution proceeds to S340. In the context of database transactions, a "commit" refers to the action of permanently saving all the changes made during the current transaction to the database. When a transaction is committed, all the operations within that transaction are made permanent and can be seen by other users and transactions. Until a transaction is committed, its changes are not visible to other users and transactions.

At S340, upon receiving a commit statement from the client, a commit process of the transaction (received at S310) is performed. Execution of the commit process is performed to ensure the ACID properties of the transaction. In an embodiment, during the commit process, the modifying transaction agent is configured to perform the actions necessary to turn its uncommitted row-versions into committed row-versions. Such actions are performed while a commit pause(s) taken by the modifying transaction agent are still acquired (i.e., prior to the commit pauses release).

It should be noted that typically a transaction is not purely executed inside the database 120. Instead, transaction execution is effectively a shared effort between the client and the underlying database, as the client can submit statements, perform algorithmic logic, and, as a result, submit more statements, all as part of the same transaction. The CC protocols used by the database can be very effective in enforcing how activities are being performed inside the underlying database. It, therefore, can be very effective in making those enforcements for the execution of the statements submitted by the client on behalf of the transaction. However, the database has limited abilities to dictate the behavior of the transaction algorithmic logic running on the client due to external behavior. Such an external behavior can sometimes completely break the level of ACID guarantees provided by the underlying database's CC protocol in use for the transaction.

For example, in a perfectly serializable isolation-level, a client submits a statement that reads some data-cells, and the statement returns those read values to the client, while the transaction is still in progress. If the client communicates those read values outside of the logical scope of the transaction, the client may seriously violate the isolation-level guarantees it tries to achieve with that transaction (as those values must not be relied on at that stage in time prior to the transaction commitment, by anybody else but that specific transaction). Therefore, it is generally expected that the client logic for the transaction will obey some general rules if it expects to achieve the exact isolation-level that is guaranteed by the underlying database's CC-protocol in use for the transaction.

Some database products support multiple different isolation-levels, supported by different CC-protocols (and/or different variations of the same CC-protocol). Furthermore, those databases often allow multiple transactions to run under different isolation-levels simultaneously, even if they access the same tables, rows, cells (or any other relevant data-object). Some databases can support multiple CC-protocols/isolation-levels, where multiple simultaneous transactions could choose their specific isolation-level.

It should be noted that there are cases where a database supports multiple different CC-protocols that all provide more-or-less (or exactly) the same isolation-level-those CC-protocols have different implementations and different performance characteristics. In such cases, the one of ordinary skill may choose the best-fitting CC-protocol for each of his transactions, based, for example, on his knowledge about which CC-protocol will perform best for each of his transactions. For example (and that example is specifically relevant for the disclosed embodiments), in environments that expect fully-serializable execution, it is sometimes better to execute read-only transactions using a PiT-based CC-protocol, while running the transactions that modify data-cells (e.g., read/write transactions) using a CC-protocol that allows serializable execution of such transactions (e.g., the 2PL CC-protocol). This way, the read-only transactions enjoy serializable execution while still not conflicting with the modifying transactions, and hence transaction concurrency is not hurt. This may be especially useful for long-running read-only transactions, such as the ones found, for example, in OLAP workloads.

The commit process performed at S340 supports different isolation levels and different CC protocols. At S350, a commit acknowledgment (ack) is returned to the client, thereby ending the execution of the received transaction.

The various embodiments mentioned in process 300 including the embodiments for creating the PiT, are discussed in greater detail in U.S. patent application Ser. No. 18/431,285, assigned to the common assignee, and it is incorporated herein by reference.

According to the disclosed embodiments, once a PiT is no longer required because the transaction or statement using the PiT has completed its execution, the PIT can be removed. Specifically, as discussed in detail below, when unified PiTs are in use, a (unified) PiT is no longer required when all its "enjoying transactions" and/or "enjoying statements" completed their execution. The removal of the PiT can be done immediately and asynchronously or deferred to a later time. After the removal of the PiT, some row-versions may become unnecessary. These row-versions are those that are not required anymore, as no PiT-read or current-read would access their data-cells. Such unneeded row-versions can then be removed. The removal of these row-versions can take place immediately and asynchronously or deferred to a later time.

Figure 4:
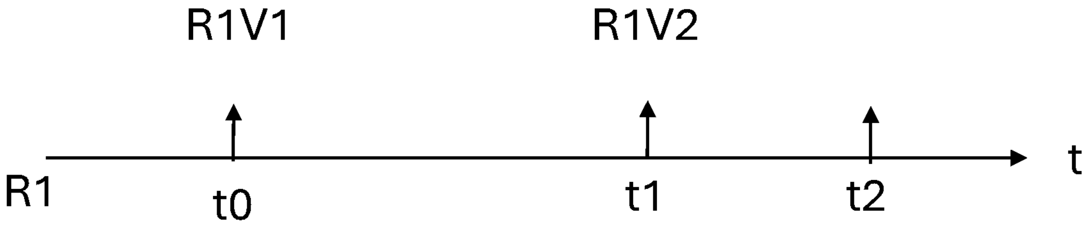
FIG. 4 is a timeline demonstrating a technique for determining whether a specific-row version is unneeded according to an embodiment.

FIG. 4 is an example timeline demonstrating a technique for determining whether a specific-row version is unneeded to provide reliance information to the node as to the existence of a PiT, according to an embodiment.

In this embodiment, row R1 is in a node N1. R1V1 and R1V2 are two consecutive row-versions of R1 whose CMTSs are t0 and t1, respectively; t2 is a moment in time after R1V2 is committed in the node. At t2, in order for a node to detect whether R1V1 is an unneeded row-version, the node determines whether there is no PiT in existence at t2 whose PiT timestamp overlaps with the CMTSs of R1V1 and R1V2—i.e., whose PiT timestamp is between t0 and t1.

The following is a detailed description of the processes for removing unneeded row-versions according to the disclosed embodiments.

According to some embodiments, committed row-versions may become unneeded row versions. A row-version can turn into an unneeded row-version when no PiT read or current read operation will return data-cells from that row-version. In an embodiment, the way in which a row-version can turn into an unneeded row-version can be divided into two different classes: a commitment class and a PiT removal class. In the commitment class, a row-version (e.g., R1V1) can become unneeded when a new row-version (e.g., R1V2) becomes committed and there is no present (or future) PiT whose timestamp is in-between the CMTS of the new row-version R1V2 and the CMTS of the earlier committed row-version R1V1, wherein the earlier committed row-version R1V1 becomes unneeded.

In the PiT removal class, a row-version can become unneeded when a PiT is removed. For example, in an embodiment, a new row version R1V2 becomes committed for a row that already has an earlier committed row version R1V1 as shown in FIG. 4, and there is a PiT (e.g., P10) whose timestamp is in-between the CMTS of R1V2 and the CMTS of R1V1. If PiT P10 is removed and there are no other existing PiTs whose timestamps are in between the CMTS of R1V2 and the CMTS of R1V1 then R1V1 becomes unneeded.

According to an embodiment, the commitment class occurs shortly after commitment. In an embodiment, the unneeded row-version may be detected relatively shortly after the commitment of the new row-version (i.e., "immediate" commitment class unneeded row-version).

According to an embodiment, the PiT removal class may occur shortly after commitment but does not necessarily have to occur immediately after the commitment of the next row-version. As a non-limiting example, a PiT can be removed shortly after the commitment of a transaction (i.e., TR1) that added a row version to a row (i.e., R1), and depending on the implementation, such an event may result in an early row-version of R1 to be detected within a relatively short time as an unneeded row-version. Accordingly, the PiT removal class can occur in a contemporaneously undefined time (i.e., gray area) and could include an "immediate" PiT removal class unneeded row-version and a "non-immediate" PiT removal class unneeded row-version.

The immediate commitment class unneeded row-versions can be generated in many cases. Typically, they can be created when there are many PiT-free transactions or due to various timings among commitments and PiT creations. In an embodiment, the immediate cleaning technique includes cleaning immediate commitment class unneeded row-versions, as well as opportunistic cleaning of immediate PiT removal class unneeded row-versions.

According to an embodiment, the immediate cleaning technique can be utilized with a known cleaning technique, such that the known cleaning technique will subsequently clean (following the cleaning by the immediate cleaning technique) the remaining, uncleaned unneeded row-versions. It is noted that the incorporation of the immediate cleaning technique will reduce resource utilization as well as improve performance regardless of any amount of unneeded row-versions to be subsequently cleaned by a known cleaning technique. It is, therefore, advantageous to utilize the immediate cleaning technique to remove at least some of the unneeded row-versions.

Figure 5:
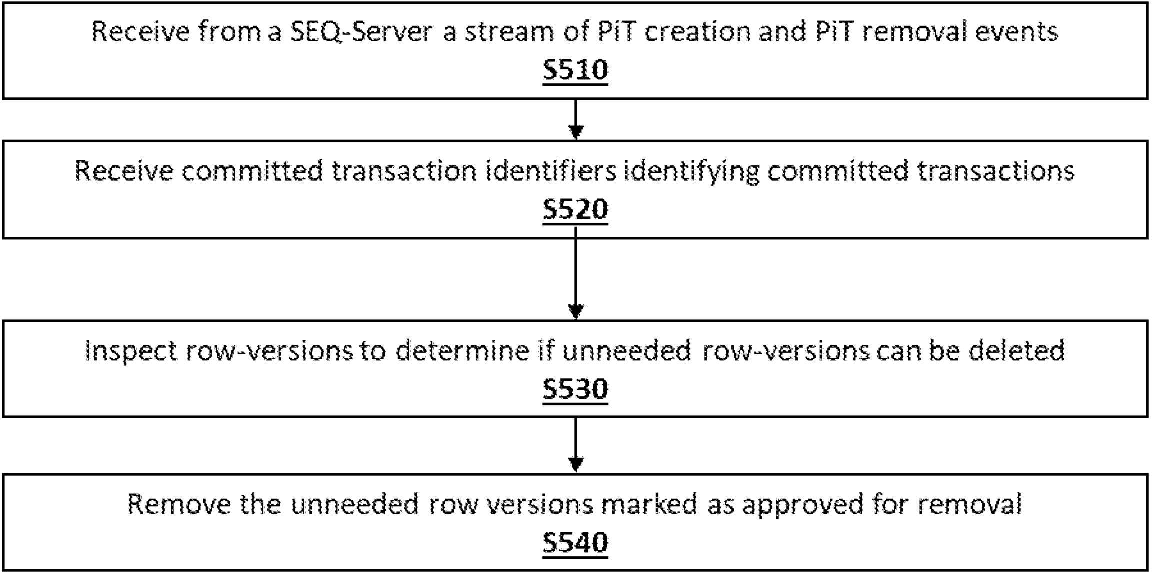
FIG. 5 is a flowchart of a process for removing unneeded row-versions according to an embodiment.

FIG. 5 is an example flowchart of a process 500 for removing unneeded row-versions according to an embodiment. The process 500 may be executed by a node of a database 120. It should be noted that each node can run process 500 independently of each other.

At S510, a stream of PiT creation and PiT removal events ("PiT stream") is received from a sequencer server (SEQ-server). The PiT stream is generated by the SEQ-server 229 and streamed to all nodes in the database 120. Specifically, the SEQ-server asynchronously streams to each of the nodes that contain MVCC storage (i.e., nodes in which data can be read/written) information about unified PiT creation and removal.

That streaming is done according to an order that gives a destination node "certainty" up to a specific point in time (Certainty Timestamp). That point in time is monotonically increasing as the stream continues. The destination node can safely handle ("Inspect") newly committed row-versions of transactions committed prior to the certainty timestamp, where that handling allows determining whether the earlier committed row-version for each such inspected row-version is unneeded or needed.

The streaming can monotonically increase the certainty timestamp even if no new PiT creation or PiT removals take place. Under a variation of the streaming technique, streaming is performed with an inherent data-reduction technique where, under some circumstances, if the event of a specific unified PiT creation has not yet been submitted to a specific node and that unified PiT was already removed, then that specific unified PiT is completely omitted from the stream while keeping the correctness of the process. The generation of the PiT stream is further described in more detail in FIG. 6 below.

According to the present disclosure, a node maintains a PiT Collection data structure ("PiT collector") that contains the information on the PiTs (as received by the node). The node further maintains a current certainty timestamp. This timestamp may be included in the PIT collector. The PIT information may include the timestamp of each PiT.

In an embodiment, S510 includes receiving from an SEQ-server a PiT stream and updating the certainty timestamp according to the received event. The certainty timestamp, in an embodiment, may be incremented for each PiT creation event, each PiT removal event, and a progress certainty timestamp event. S510 further includes adding a PiT creation event to the PiT collector and removing a PiT creation event from the PiT collector, depending on the event type designated in the received PiT stream.

At S520, committed transaction identifiers, identifying committed transactions, are received. The various transaction managers provide such identifiers to the node executing process 500. The identifiers may be communicated synchronously or asynchronously. Communicating committed transaction identifiers is further discussed in the '285 Application.

It should be noted that S510 and S520 can be performed in parallel or different orders. That is, there is no dependency on the communication of PiT streams and identifiers to nodes in the database 120.

At S530, row-versions are inspected to identify unneeded row-versions that can be deleted. The process for inspecting row-versions is further described in more detail in FIG. 8 below. In an embodiment, S530 returns a list including one or more row-versions marked as approved for removal.

At S540, the unneeded row-versions marked as approved for removal are removed. This includes deleting data stored, maintained, or associated with such row-versions.

Figure 6:
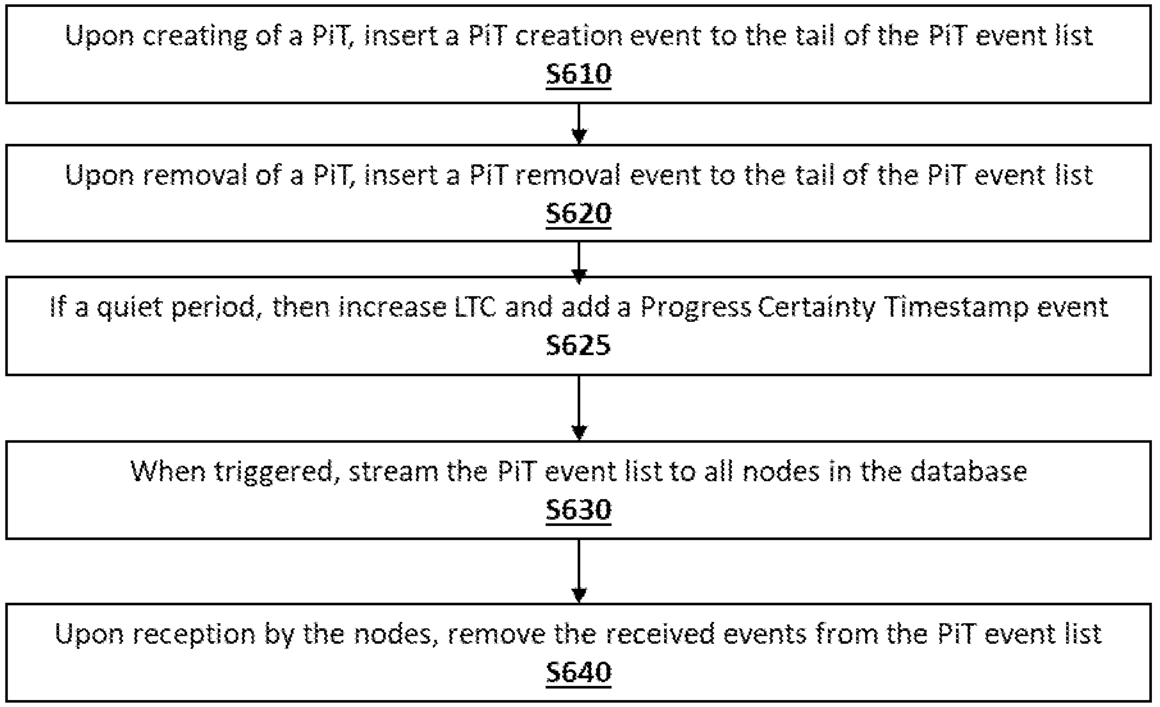
FIG. 6 is a flowchart of a process for generating a PiT stream including PiT creation and removal events according to an embodiment.

FIG. 6 is an example flowchart of a process S510 for generating a PiT stream including PiT creation and removal events. In an embodiment, the process may be performed by the SEQ-Server, such as SEQ-server 229, FIG. 2.

At S610, upon the creation of a PiT, a PiT creation event is inserted into the tail of the PiT event list. The PiT event list may be stored in the memory (not shown) of the SEQ-server. The PiT event list may be any type of data structure maintaining, for example, a FIFO structure. According to an embodiment, when a unified PiT is created, and as a part of the unified PiT creation, a unified PiT creation event is added to the tail of the PiT event list. In an embodiment, all unified PiT creation events are stored in order by their PiT creation timestamps.

At S620, upon removal of a PiT, a PiT removal event is inserted into the tail of the PiT event list. In an embodiment, after the determination that the unified PiT can be removed, a unified PiT removal event is added to the tail of the PiT event list. In an embodiment, the PiT removal event is added instantaneously with respect to the determination that the PiT can be removed. In another embodiment, the PIT removal event is added at a later moment following the determination that the unified PiT can be removed. As will be discussed below, the removal of a PiT can be communicated by a node to the SEQ-server. Alternatively or collectively, the removal of PiT can be deducted by SEQ-server.

According to an embodiment, all PiT removal events are stored in order by their PiT removal timestamp (irrespective of whether it is explicitly in use or not). Note, that the PiT removal event will never be located before its corresponding unified PiT creation event.

At S625, at the end of a quiet period, a progress certainty timestamp event may be added to the tail of the PiT event list and the LTC may be increased. A quiet period is when no PiT creation/removal event has been added during a predetermined time window. For example, if 1 second passes and no PiT creation/removal event takes place, then the LTC is incremented, and a progress certainty timestamp event is added. Then, another 1 second passed, and there were still no PiT creations/removals, the S625 is repeated. The progress certainty timestamp event includes the corresponding timestamp (LTC value).

It should be noted that S625 is required due to the in-order nature of streaming and the fact that unified PiT creation events are streamed in a monotonically increasing order, each node can determine which logical timestamp it has complete information about (i.e., certainty) in regards to the creation of unified PiTs (i.e., each node can determine a logical timestamp where the node knows about any unified PiT that was created and still exists with a PiT timestamp smaller or equal to). In an embodiment, the determination by a node is performed by using the latest unified PIT creation timestamp received, as a certainty time stamp.

In an embodiment, the unified PiT removal timestamps can be used to progress the certainty timestamp when the unified PiT removal event is received. In some embodiments, where unified PiTs are not created or removed for an extended period of time, various techniques (e.g., streaming to a specific node to plant an entry in the stream that just updates the certainty timestamp up to the current value of LTC) can be used to progress certainty timestamps.

At S630, when triggered, events in the PiT event list are streamed as a PiT stream to all nodes in the database in a monotonically increasing order. According to an embodiment, the SEQ-server streams the content of the PIT event list to each of the database nodes that maintain MVCC data-layout (i.e., those that may need that information). The streaming to each destination node is done in a head-to-tail operation, and in a way that ensures in-order delivery to each of the nodes. In an embodiment, the streaming to each node is generally independent (i.e., one stream to one destination can progress faster or slower than another, etc.). In some embodiments, the SEQ-server performs the streaming asynchronously to the insertion of events. In a further embodiment, the SEQ-server can delay any of the streams, which can achieve aggregation or other performance advantages. As a non-limiting example, for each destination node, the SEQ-server may use a strategy such as waiting until 10 KB of information is aggregated or 0.1 seconds (the earlier of the two) and submit all the aggregated events, and repeat such process in an endless loop.

At S640, upon reception of the events by the nodes, the received events are removed from the PiT event list. According to an embodiment, the SEQ-server removes the events at the head of the PiT event list, once the events are successfully propagated to all nodes they are destined to.

In some embodiments, the process S510 is a simplistic in-order streaming. In other embodiments, the process can be improved by utilizing information about the creation of a unified PiT (i.e., P1) that has not yet been submitted to a node (i.e., N10), and where P1 was already removed. In such embodiments, information regarding the creation of P1 is not sent to N10, wherein the moments of inspection of row-versions by N10 will be delayed such that the lack of P1 can allow concluding additional row-versions as unneeded.

In some embodiments, streaming also includes the SEQ-server maintaining whether a unified PiT creation event in the PiT event list has already streamed to at least one node. In an embodiment, when a unified PiT creation event is added, a flag is set to FALSE. Subsequently, the flag can turn to TRUE when the event is streamed for the first time, in which the flag stays TRUE until that event is removed from the list.

In some embodiments, when the SEQ-server determines that a unified PiT can be removed the SEQ-server performs a certain action depending on circumstances. In an embodiment where the corresponding unified PiT creation event exists in the PiT event list and has not yet been streamed to any destination node, then the corresponding unified PiT creation event is removed from the PiT event list and the PiT removal event is not added to the PiT event list.

In a further embodiment, if the corresponding unified PiT creation event does not exist in the PiT event list, a unified PiT removal event is added to the tail of the PiT event list. Such an embodiment can occur when the corresponding unified PiT creation event has already been streamed to all the nodes and has already been removed from the PiT event list.

In yet a further embodiment, where the corresponding unified PiT creation event exists in the PiT event list and the event has already been streamed to at least one destination node, then the corresponding unified PiT creation event is removed from the PiT event list, and the PiT removal event is added to the PiT event list. In some cases, a node may receive a PiT removal event for a unified PiT that it did not receive a creation event for. In such cases, the node will ignore the removal event.

Figure 7:
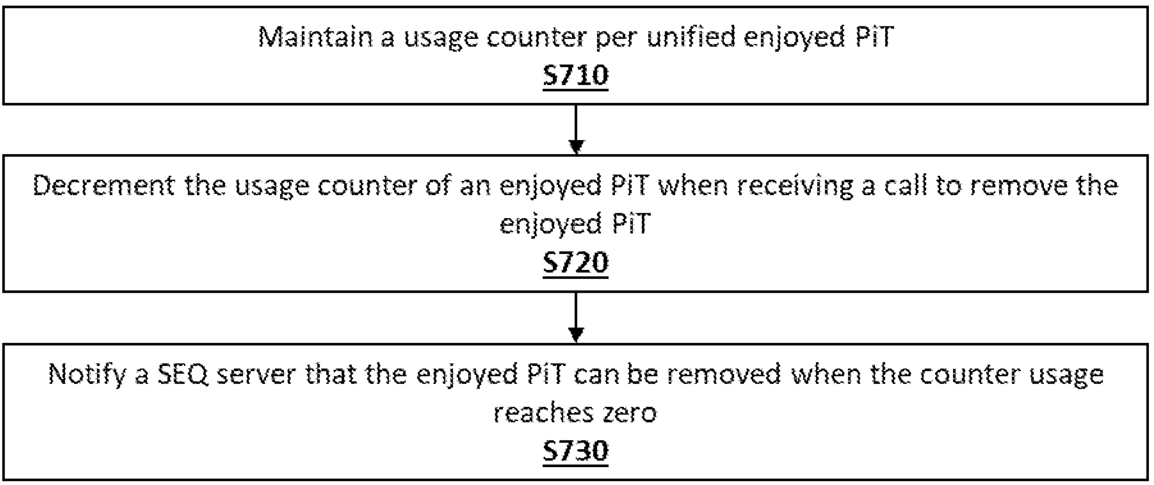
FIG. 7 is a flowchart of a process for communicating PiTs removal from a node to a SEQ-server according to an embodiment.

FIG. 7 is an example flowchart of a process 700 for communicating PiTs removal from a node to a SEQ-server according to an embodiment. A node enjoyed a Unified PiT (P1) if there were transaction managers in that node (and its SEQ-agent) that participated in P1 creation and hence used its PIT timestamp. Process 700 provides a mechanism wherein if a node enjoys a unified PiT (P1), the node will be able to make the SEQ-server know when all transaction managers no longer need the unified PiT (P1) and hence, from the node (and its SEQ-agent) perspective, the PIT (P1) can be removed.

At S710, a SEQ-agent-side usage counter per Enjoyed Unified PiT is maintained. According to an embodiment, an SEQ-agent (i.e., SA1) maintains a SEQ-agent-side usage counter for each Enjoyed Unified PiT. In an embodiment, the SEQ-agent-side usage counter is not needed (and can be deallocated) when the specific unified PIT is removed or asked to be removed. In an embodiment, a value of the SEQ-agent-side usage counter represents the number of transaction managers currently enjoying the unified PiT from that SEQ-agent's perspective. That is, the SEQ-agent-side usage counter is a usage counter located in the SEQ-agent. In an embodiment, the initial value of the SEQ-agent-side usage counter is set by PiT creation technique procedures, according to the number of local transaction managers that participate in the unified PiT creation using that SEQ-agent.

At S720, the SEQ-agent-side usage counter of an Enjoyed Unified PiT is decremented when receiving a call to remove the enjoyed PiT. According to an embodiment, when a transaction manager no longer needs a unified PiT (e.g., P1), the transaction manager calls the SEQ-agent (e.g., SA1). In an embodiment, SEQ-agent decrements the SEQ-agent-side usage counter of the specific PiT.

At S730, the SEQ-server is notified that the Enjoyed Unified PiT can be removed when the SEQ-agent-side usage counter reaches zero. According to an embodiment, once the SEQ-agent-side usage counter of a specific unified PiT (e.g., P1) reaches zero, the SEQ-agent notifies the SEQ-server that Enjoyed Unified PiT is no longer needed (by the SEQ-agent which was "enjoying" the PiT). In an embodiment, the notification takes place asynchronously with the call of the transaction manager to the SEQ-agent.

In an embodiment, the notifications can be aggregated and merged with other messages the SEQ-agent (or other entities in the node) sends to the SEQ-server.

In an embodiment, there are no unified PiTs. In such a case, the process 700 assumes that the PiT is a special unified PiT that is used by exactly one transaction manager. In such an embodiment, the SEQ-agent-side usage counter is not necessary as the SEQ-agent-side usage counter will be decremented to zero following the call of the first transaction manager to the SEQ-agent.

In a further embodiment, a hierarchy of SEQ-agents is utilized in process 700. In such an embodiment, each parent SEQ-agent manages a parent SEQ-agent-side usage counter for each Enjoyed Unified PiT, counting how many of its child SEQ-agent(s) enjoy that unified PiT. Whenever a regular (child) SEQ-agent realizes information that an Enjoyed Unified PiT is no longer needed (e.g., its (child) SEQ-agent-side usage counter reaches zero) the (child) SEQ-agent sends the information to the pertinent parent SEQ-agent. In an embodiment, the parent SEQ-agent can decrement its parent SEQ-agent-side usage counter, and whenever the parent SEQ-agent-side usage counter reaches zero, the parent SEQ-agent will send such a message to the SEQ-server.

In an embodiment, the SEQ-Server can deduce that a PiT may be removed. To that end, the SEQ-Server maintains a SEQ-server-side usage counter for each unified PiT it created. The value of the SEQ-server-side usage counter represents the number of SEQ-agents (or parent SEQ-agents) currently enjoying that unified PiT. The initial value of the usage counter is set based on the number of SEQ-agents (or parent SEQ-agents) that participate in that unified PiT creation.

When the SEQ-server receives a message from an SEQ-agent that a unified PiT is no longer needed, the SEQ-server-side usage counter of the respective unified PiT is decremented. Once the SEQ-server-side usage counter of a respective unified PiT reaches zero, the SEQ-server deduces that the unified PiT is no longer needed by any SEQ-agent and hence can be removed. That is, a PiT removal event can be added to a PiT event list.

Optionally, a Unified PiT Removal Timestamp can be used to indicate unified PiT removal. The Unified PIT Removal Timestamp is the LTC value at the removal moment.

Figure 8:
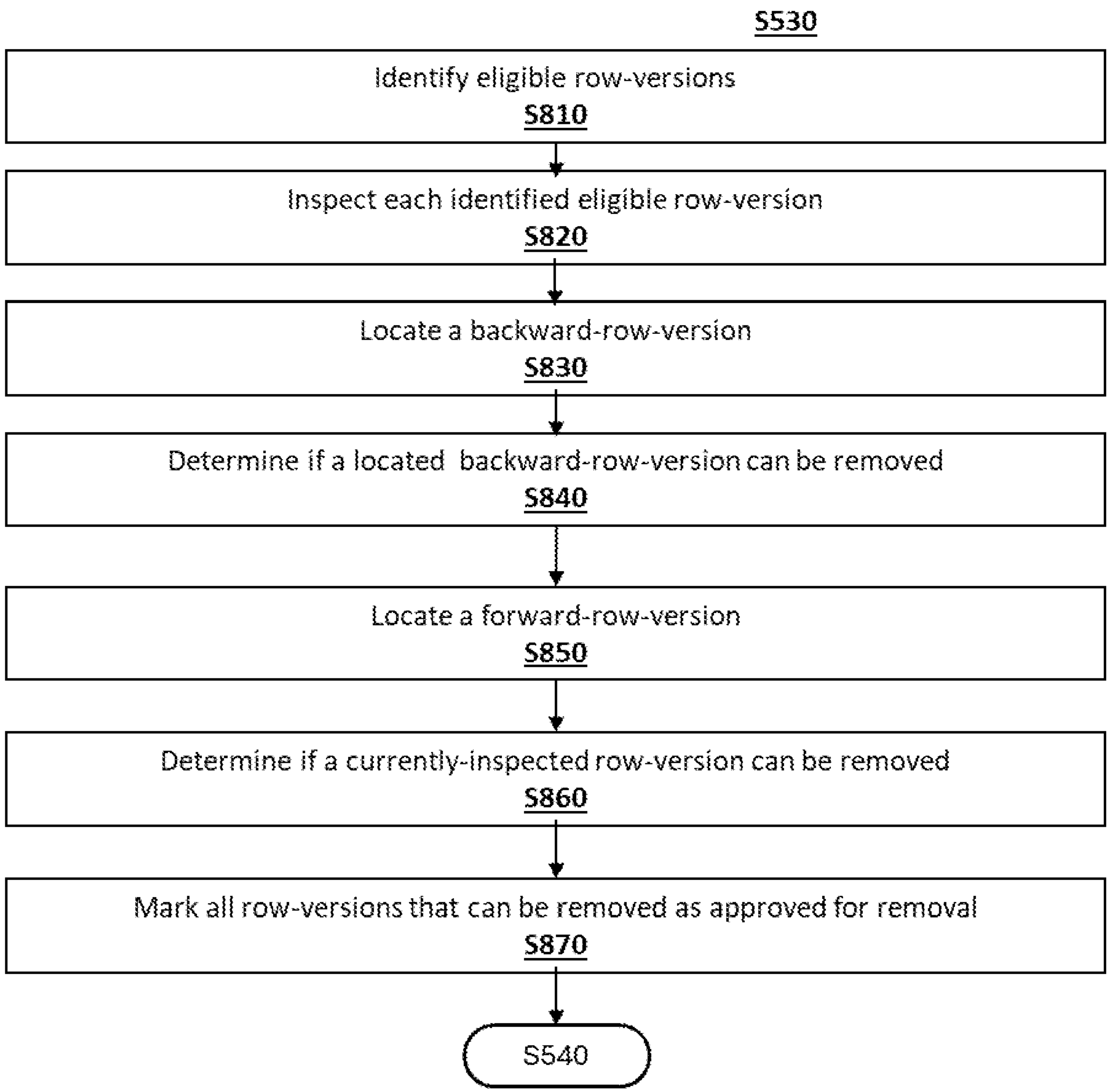
FIG. 8 is a flowchart describing the process for inspecting row-versions according to an embodiment.

FIG. 8 is an example flowchart describing the process S530 for inspecting row-versions S530 according to an embodiment. According to an embodiment, in the immediate cleaning technique, each committed row-version is inspected exactly once. A committed row-version that has not yet been inspected will be denoted here as Inspection-Pending Row-Version. A committed transaction having writes containing at least one Inspection-Pending Row-Version will be denoted here as an Inspection-Pending Transaction. A node (N1) maintains the following data structures:

1. Existing PiT collector which captures the current certainty timestamp, as well as information about the PiTs that exist true to that certainty timestamp.
2. Inspection-Pending Transaction collector which maintains information about which transactions contain at least one Inspection-Pending Row-Version in their write-vector. Those are, by definition, committed transactions.
3. Write vectors for all the Inspection-Pending Transactions. Such write-vector contains the CMTS of the transaction as well as the list of all the writes that the transaction did (i.e., row-versions). Depending on the exact inspection algorithm in use, some additional properties may be included for each of the row-versions (e.g., an indication of whether that row-version was already inspected or not, etc.).

At S810, row-versions eligible for inspection are identified. According to an embodiment, identifying an eligible row-version includes identifying a row-version that is both Inspection-Pending Row-Version and having a commitment timestamp (CMTS) smaller than (or smaller-equal to) the current certainty timestamp. In an embodiment, more row-versions may become eligible when, i.e., the certainty timestamp is increased. In an embodiment, when a transaction (TR) commits, more row-versions may become eligible.

According to an embodiment, a technique to efficiently identify an eligible row-version that is allowed to pass inspection (i.e., an Inspection-Pending Row-Version having a CMTS smaller than the current certainty timestamp) can be utilized. In an embodiment, the technique chooses the earliest Committed Inspection-Pending transaction (i.e., TR1) via the Inspection-Pending Transaction collection (assuming some sort of temporal order i.e., CMTS-order-preserving manner).

In an embodiment where the commitment timestamp of an Inspection-Pending Transaction TR1 is higher than the certainty timestamp, the technique waits until either the certainty timestamp will sufficiently advance, or until a new transaction joins the inspection-pending transaction collection with a CMTS that is smaller than the certainty timestamp.

In an embodiment where the commitment timestamp of the Inspection-Pending Transaction TR1 is lower (or lower-equal depending on implementation) than the certainty timestamp, then all the row-versions of TR1 can be selected and inspected, in any order. Following the inspection of row-versions of TR1, the technique removes the transaction from the Inspection-Pending Transaction collection and can seek the next eligible transaction.

As a non-limiting example, a bulk inspection can be performed where row-versions that are located near each other on the MVCC data-layout disk pages are treated together, or consecutively.

At S820, each identified eligible row-version (R1Vn) is inspected.

At S830, a backward-row-version is located. A backward-row-version is defined as the latest committed row-version of a row (R1) whose CMTS is earlier than the CMTS of R1Vn, if any. Note that a backward-row-version may or may not exist. According to an embodiment, the MVCC data-layout is requested to locate the latest committed row-version of R1 having CMTS earlier than the CMTS of R1Vn, if any.

At S840, it is determined if the located backward-row-version (if any) is unneeded and hence can be removed. That is, —if R1Vb, which is a backward-row-version of R1Vn exists, then it should be determined if R1Vb is unneeded and can therefore be removed. To this end, the existing PiT collector is checked to determine whether there is currently a PiT (i.e., P) with a timestamp (i.e., TS (P)) that is in a range between the commitment timestamp of the backward-row-version R1Vb to the commitment timestamp of the currently inspected row-version R1Vn (i.e., CMTS (R1Vb), . . . , CMTS (R1Vn)). If no such PiT exists, then the backward-row-version (R1Vb) can be identified as an unneeded row-version and can be removed. The removal of such row-version can be performed synchronously or asynchronously.

At S850, a forward-row-version is located. A forward-row-version is defined as the earliest committed row-version of row (R1) whose CMTS is later than R1Vn, but that is still smaller than the certainty timestamp, if any. Note that a forward-row-version may or may not exist. According to an embodiment, the MVCC data-layout is requested to locate the earliest committed row-version of R1 whose CMTS is later than the CMTS of R1Vn (but that is still smaller than the certainty timestamp), if any.

At S860, it is determined if a currently-inspected row-version R1Vn is unneeded and hence can be removed. That is if R1Va, which is a forward-row-version of R1Vn exists, then it should be determined if R1Vn is unneeded and can, therefore, be removed. According to an embodiment, the existing PiT collector is checked to determine whether there is currently a PiT (i.e., P) with a timestamp (i.e., TS (P)) that is in a range between the commitment timestamp of the currently inspected row-version R1Vn and the commitment timestamp of the forward-row-version R1Va (i.e., CMTS (R1Vn) . . . . CMTS (R1Va)). If no such PiT exists, then the currently inspected row-version R1Vn can be identified as an unneeded row-version and could be cleaned (either synchronously or asynchronously). In an embodiment, R1Vn can be removed from the write-vector, as well as, a transaction TR1 can potentially be removed from the Inspection-Pending Transaction collector if it no longer contains any further Inspection-Pending Row-Versions.

As a non-limiting example, this check is performed to deal with a potential race condition where R1Va becomes Inspection-Pending Row-Version and is inspected before a node (i.e., N1) knew that R1Vn became committed. A race condition can occur when the transactions that wrote R1Va and R1Vn may be managed by two transaction managers located in different nodes. In an embodiment, for row-versions of rows that are in a commit pause, no inspection occurs. In another embodiment, the race condition remains uncleaned and can be subsequently cleaned by the general cleaning technique. It should be noted that steps S830 through S860 are performed for each eligible row version.

At S870, all row-versions that can be removed (as determined as S840 and S860) are marked as approved for removal. Note that all inspected row-versions are marked as inspected. According to an embodiment, R1Vn is marked and considered inspected, unless R1Vn was cleaned as well as removed from the write-vectors. In a further embodiment, the relevant structures are maintained (e.g., if all the transaction's row-versions are inspected, remove the transaction from the Inspection-Pending Transaction collection, etc.).

Figure 9:
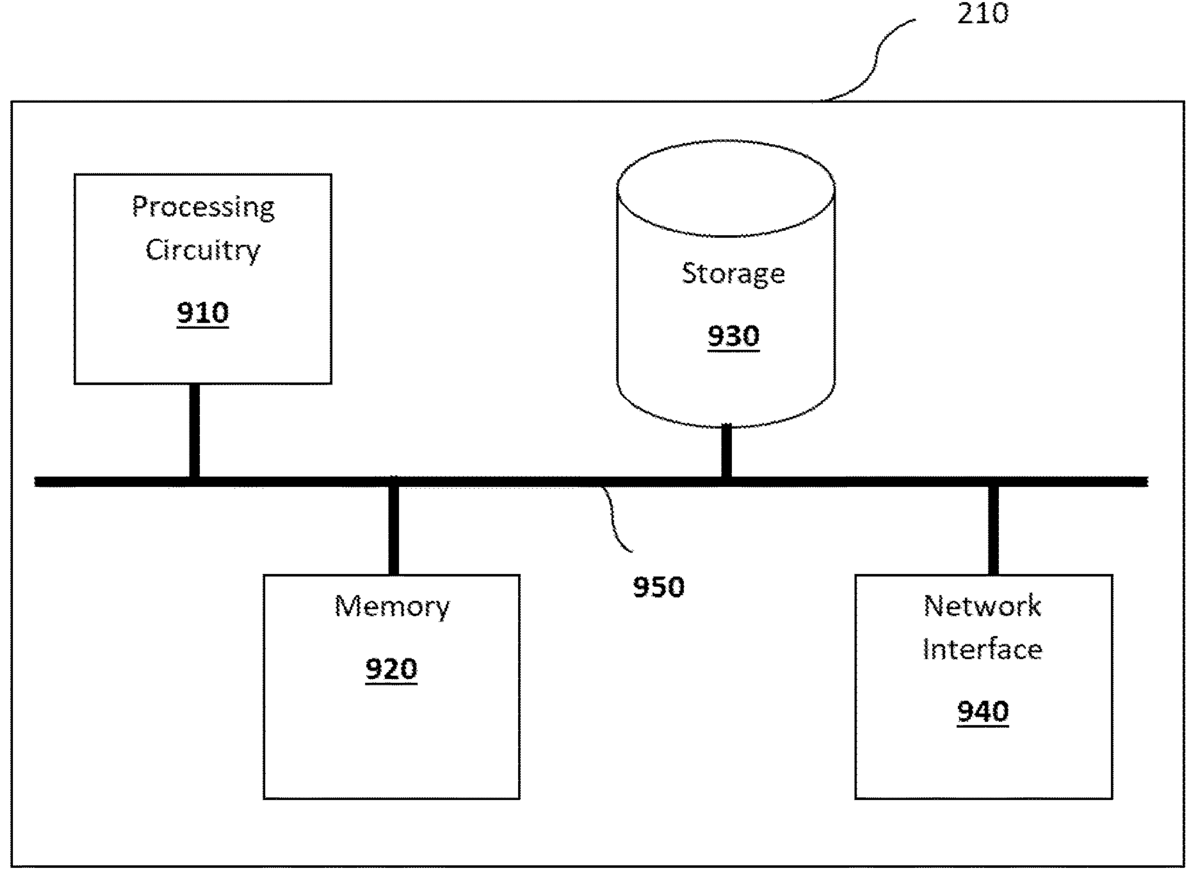
FIG. 9 is a schematic diagram of a hardware layer of a node in a database according to an embodiment.

FIG. 9 is an example schematic diagram of a hardware layer of a node 210 in a database 120 according to an embodiment. The node 210 includes a processing circuitry 910 coupled to a memory 920, a storage 930, and a network interface 940. In an embodiment, the components of the node 210 may be communicatively connected via a bus 950.

The processing circuitry 910 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 920 may be volatile (e.g., random access memory, etc.), non-volatile (e.g., read-only memory, flash memory, etc.), or a combination thereof.

In one configuration, software for implementing one or more embodiments disclosed herein may be stored in the storage 930. In another configuration, the memory 920 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 910, cause the processing circuitry 910 to perform the various processes described herein.

The storage 930 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 940 allows the node to communicate with, for example, other nodes or with a transaction manager. It should be understood that the embodiments described herein are not limited to the specific architecture illustrated in FIG. 9, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be plural and vice versa with no loss of generality. In the drawings, like numerals refer to like parts through several views.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), memory, and input/output interfaces. The computer platform may also include an operating system and microinstruction code. The various processes and functions described herein may be either part of the microinstruction code or part of the application program, or any combination thereof, which may be executed by a CPU, whether such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to further the art and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone, B alone; C alone; A and B in combination; B and C in combination; A and C in combination; or A, B, and C in combination.

What is claimed is:

1. A method for cleaning unneeded row-versions in a distributed database system including a plurality of nodes, comprising:

receiving, by a node of the plurality of nodes of the distributed database system, a stream of at least Point-in-Time (PiT) creation events and PiT removal events, wherein a PiT removal event is created when a PiT is removed and PiT removal events are in order in the stream by their respective PiT removal timestamp, and wherein a node of the plurality of nodes includes at least a storage storing row-versions;

maintaining, by the node, a PiT collection data structure storing PiT information indicated by the received PiT creation events and PiT removal event, and a current certainty timestamp that monotonically increases based on the received streams;

receiving a list of committed transaction identifiers (IDs) of committed transactions executed by the distributed database system;

maintaining, by the node, an inspection-pending transaction collector identifying committed transactions having at least one inspection-pending row-version in an associated write vector;

selecting, from a write vector associated with an inspection-pending committed transaction, at least one inspection-pending row-version having a commitment timestamp (CMTS) less than or equal to the current certainty timestamp;

determining that a candidate row-version is unneeded by checking the PIT collection data structure to confirm an absence of any PiT timestamp in a range between a CMTS of the candidate row-version and a CMTS of an adjacent located row-version; and deleting, from a Multi-Version Concurrency Control (MVCC) data-layout in the storage, each row-version determined to be unneeded, including updating at least one of the write vector and the inspection-pending transaction collector based on the deletion.

2. The method of claim 1, wherein an unneeded row-version is at least a first committed row-version with a row having a second committed row-version and is indicated by an absence, in the PIT collection data structure, of any PiT timestamp between the commitment timestamps of the first and second committed row-versions, wherein the second committed row-version has been committed after the first committed row-version.

3. The method of claim 1, wherein the PiT creation events and PiT removal events are streamed by a sequencer server (SEQ-Server) asynchronously to the plurality of nodes, wherein the SEQ-Server streams the events from a PiT event list in an order that monotonically advances the certainty timestamp at each node.

4. The method of claim 3, further comprising:

upon creating a PiT, inserting, by the SEQ-Server, a PIT creation event to a tail of a PiT event list;

upon removing of a PiT, inserting, by the SEQ-Server, a PiT removal event to the tail of a PiT event list;

upon receiving a streaming trigger, streaming events in the PiT event list to the plurality of nodes;

upon reception of an event by the plurality of nodes, updating, at the node, the PiT collection data structure and the current certainty timestamp based on the received event; and removing the event from the PiT event list.

5. The method of claim 4, further comprising:

upon detecting a quiet period, increasing a logical time counter (LTC), wherein the quiet period is a predefined time window during which no events are added to the PIT event list; and adding a progress certainty timestamp event to the PiT event list for causing each node to update the current certainty timestamp in the absence of PiT creation events or PiT removal events.

6. The method of claim 4, further comprising:

communicating a removal of PiTs from each node of the plurality of nodes to the SEQ-Server based on an SEQ-agent-side usage counter maintained for an enjoyed unified PiT.

7. The method of claim 6, wherein a PiT being removed is a unified PiT, and wherein communicating a removal of a unified PiT occurs when no transaction enjoys the unified PiT as indicated by the SEQ-agent-side usage counter reaching zero.

8. The method of claim 1, wherein inspecting the row-versions further comprises:

identifying at least one eligible row-version for inspection;

inspecting each identified eligible row-version to:

locate a backward-row-version for removal in each eligible row-version;

determine if a located backward-row-version can be removed;

locate a forward-row-version for removal in each eligible row-version;

determine if a currently-inspected row-version can be removed based on the located forward-row-version and the currently-inspected row-version; and marking as approved for removal any row-version determined that can be removed, wherein locating the backward-row-version and the forward-row-version comprises issuing one or more requests to the MVCC data-layout in the storage, and wherein determining whether a row-version can be removed comprises checking the PIT collection data structure for an absence of a PiT timestamp in a range defined by the relevant commitment timestamps.

9. The method of claim 8, wherein identifying eligible row-version further comprises:

identifying a row-version that is inspection-pending and having a commitment timestamp (CMTS) smaller than or equal to a current certainty timestamp maintained at the node based on the stream.

10. The method of claim 8, wherein the backward-row-version is a latest committed row-version of a row whose CMTS is earlier than a CMTS of a currently inspected row-version; and wherein a forward-row-version is an earliest committed row-version of a row whose CMTS is later than a CMTS of the currently inspected row-version, and is smaller than a certainty timestamp maintained at the node.

11. The method of claim 1, wherein a PiT provides a state and content of committed data in the distributed database system.

12. The method of claim 1, wherein the distributed database system comprises: one SEQ-server and a plurality of SEQ-agents executed on the plurality of nodes, wherein each of the plurality of nodes includes a storage implementing a persistent data-layout that allows storing row-versions.

13. The method of claim 1, wherein a row-version stores a historical version of a row in a table in the distributed database system, wherein row-versions allow managing concurrency and provide the ability to restore or read previous versions of data.

14. A system for cleaning unneeded row-versions in a distributed database system including a plurality of nodes comprising:

a processing circuitry; and a memory, the memory containing instructions that, when executed by the processing circuitry, configure the system to:

receive, by a node of the plurality of nodes of the distributed database system, a stream of at least Point-in-Time (PiT) creation events and PiT removal events, wherein a PiT removal event is created when a PiT is removed and PiT removal events are in order in the stream by their respective PiT removal timestamp, and wherein a node of the plurality of nodes includes at least a storage storing row-versions;

maintain, by the node, a PiT collection data structure storing PiT information indicated by the received PiT creation events and PiT removal event, and a current certainty timestamp that monotonically increases based on the received streams;

receive a list of committed transaction identifiers (IDs) of committed transactions executed by the distributed database system;

maintain, by the node, an inspection-pending transaction collector identifying committed transactions having at least one inspection-pending row-version in an associated write vector;

select, from a write vector associated with an inspection-pending committed transaction, at least one inspection-pending row-version having a commitment timestamp (CMTS) less than or equal to the current certainty timestamp;

determine that a candidate row-version is unneeded by checking the PiT collection data structure to confirm an absence of any PiT timestamp in a range between a CMTS of the candidate row-version and a CMTS of an adjacent located row-version; and delete, from a Multi-Version Concurrency Control (MVCC) data-layout in the storage, each row-version determined to be unneeded, including updating at least one of the write vector and the inspection-pending transaction collector based on the deletion.

15. The system of claim 14, wherein an unneeded row-version is at least a first committed row-version with a row having a second committed row-version and is indicated by an absence, in the PIT collection data structure, of any PiT timestamp between the commitment timestamps of the first and second committed row-versions, wherein the second committed row-version has been committed after the first committed row-version.

16. The system of claim 14, wherein the PiT creation events and PiT removal events are streamed by a sequencer server (SEQ-Server) asynchronously to the plurality of nodes, wherein the SEQ-Server streams the events from a PiT event list in an order that monotonically advances the certainty timestamp at each node.

17. The system of claim 16, wherein the memory contains further instructions which when executed by the processing circuitry further configure the system to:

upon creating a PiT, insert, by the SEQ-Server, a PiT creation event to a tail of a PiT event list upon removing of a PiT, insert, by the SEQ-Server, a PiT removal event to the tail of a PiT event list upon receiving a streaming trigger, stream events in the PiT event list to the plurality of nodes;

upon reception of an event by the plurality of nodes, update, at the node, the PiT collection data structure and the current certainty timestamp based on the received event; and remove the event from the PiT event list.

18. The system of claim 17, wherein the memory contains further instructions which when executed by the processing circuitry further configure the system to:

upon detecting a quiet period, increase a logical time counter (LTC), wherein the quiet period is a predefined time window during which no events are added to the PiT event list; and add a progress certainty timestamp event to the PiT event list for causing each node to update the current certainty timestamp in the absence of PiT creation events or PiT removal events.

19. The system of claim 17, wherein the memory contains further instructions which when executed by the processing circuitry further configure the system to:

communicate a removal of PiTs from each node of the plurality of nodes to the SEQ-Server based on an SEQ-agent-side usage counter maintained for an enjoyed unified PiT.

20. The system of claim 19, wherein a PiT being removed is a unified PiT, and wherein communicating a removal of a unified PiT occurs when no transaction enjoys the unified PiT as indicated by the SEQ-agent-side usage counter reaching zero.

21. The system of claim 14, wherein the memory contains further instructions which when executed by the processing circuitry for inspecting the row-versions further configure the system to:

identify at least one eligible row-version for inspection inspect each identified eligible row-version to:

locate at least one a backward-row-version for removal in each eligible row-version determine if a located backward-row-version can be removed locate at least one a forward-row-version for removal in each eligible row-version determine if a currently-inspected row-version located forward-row-version can be removed based on the located forward-row-version and the currently-inspected row-version; and marking as approved for removal any row-version determined that can be removed wherein locating the backward-row-version and the forward-row-version comprises issuing one or more requests to the MVCC data-layout in the storage, and wherein determining whether a row-version can be removed comprises checking the PiT collection data structure for an absence of a PiT timestamp in a range defined by the relevant commitment timestamps.

22. The system of claim 21, wherein the memory contains further instructions which when executed by the processing circuitry for identifying eligible row-version further configure the system to:

identify a row-version that is inspection-pending and having a commitment timestamp (CMTS) smaller than or equal to a current certainty timestamp maintained at the node based on the stream.

23. The system of claim 21, wherein the backward-row-version is a latest committed row-version of a row whose CMTS is earlier than a CMTS of a currently inspected row-version; and wherein a forward-row-version is an earliest committed row-version of a row whose CMTS is later than a CMTS of the currently inspected row-version, and is smaller than a certainty timestamp maintained at the node.

24. The system of claim 14, wherein a PiT provides a state and content of committed data in the distributed database system.

25. The system of claim 14, wherein the distributed database system comprises:

one SEQ-server and a plurality of SEQ-agents executed on the plurality of nodes, wherein each of the plurality of nodes incudes includes a storage implementing a persistent data-layout that allows storing row-versions.

26. The system of claim 14, wherein a row-version stores a historical version of a row in a table in the distributed database system, wherein row-versions allow managing concurrency and provide the ability to restore or read previous versions of data.

27. A non-transitory computer-readable medium storing a set of instructions for cleaning unneeded row-versions in a distributed database system including a plurality of nodes, the set of instructions comprising:

one or more instructions that, when executed by one or more processors of a device, cause the device to:

receive, by one a node of the plurality of nodes of the distributed database system, a stream of at least Point-in-Time (PiT) creation events and PiT removal events, wherein a PiT removal event is created when a PiT is removed and PiT removal events are in order in the stream by their respective PiT removal timestamp, and wherein a node of the plurality of nodes includes at least a storage storing row-versions;

maintain, by the node, a PiT collection data structure storing PiT information indicated by the received PiT creation events and PiT removal event, and a current certainty timestamp that monotonically increases based on the received streams;

receive a list of committed transaction identifiers (IDs) of committed transactions executed by the distributed database system;

maintain, by the node, an inspection-pending transaction collector identifying committed transactions having at least one inspection-pending row-version in an associated write vector;

select, from a write vector associated with an inspection-pending committed transaction, at least one inspection-pending row-version having a commitment timestamp (CMTS) less than or equal to the current certainty timestamp;

determine that a candidate row-version is unneeded by checking the PIT collection data structure to confirm an absence of any PiT timestamp in a range between a CMTS of the candidate row-version and a CMTS of an adjacent located row-version; and delete, from a Multi-Version Concurrency Control (MVCC) data-layout in the storage, each row-version determined to be unneeded, including updating at least one of the write vector and the inspection-pending transaction collector based on the deletion.

* * * * *